(12) United States Patent
Wang

(10) Patent No.: US 10,586,663 B2
(45) Date of Patent: Mar. 10, 2020

(54) CAP-COVERED KEYBOARD APPARTUS

(71) Applicant: Daniel SK Wang, Taipei (TW)

(72) Inventor: Daniel SK Wang, Taipei (TW)

(*) Notice: Subject to any disclaimer, the term of this patent is extended or adjusted under 35 U.S.C. 154(b) by 0 days.

(21) Appl. No.: 16/026,280

(22) Filed: Jul. 3, 2018

(65) Prior Publication Data
US 2019/0013162 A1 Jan. 10, 2019

(30) Foreign Application Priority Data
Jul. 7, 2017 (TW) .............................. 106210075 U

(51) Int. Cl.
*H01H 13/14* (2006.01)
*H01H 13/7065* (2006.01)
*G06F 3/02* (2006.01)
*H01H 3/12* (2006.01)
*H01H 13/83* (2006.01)

(52) U.S. Cl.
CPC ....... *H01H 13/7065* (2013.01); *G06F 3/0202* (2013.01); *H01H 3/12* (2013.01); *H01H 13/14* (2013.01); *H01H 13/83* (2013.01); *H01H 2219/008* (2013.01); *H01H 2229/00* (2013.01)

(58) Field of Classification Search
CPC ........... H01H 13/705; H01H 2221/006; H01H 13/704; H01H 13/83; H01H 13/86; H01H 2223/0345; H01H 2009/187; H01H 2209/002; H01H 2229/028; H01H 2223/002; H01H 2227/01; H01H 13/7065; H01H 13/14; H01H 2219/008; H01H 2229/00; G06F 3/0202
See application file for complete search history.

(56) References Cited

U.S. PATENT DOCUMENTS

| 2008/0000767 | A1* | 1/2008 | Yoshioka | H01H 13/705 200/5 A |
| 2010/0232861 | A1* | 9/2010 | Shibata | G06F 1/1662 400/491 |

* cited by examiner

*Primary Examiner* — Ahmed M Saeed
(74) *Attorney, Agent, or Firm* — Volpe and Koenig, P.C.

(57) ABSTRACT

A cap-covered keyboard apparatus is disclosed. The proposed cap-covered keyboard apparatus includes plural independent keycaps, each of which has a main body with a top surface, and plural cover layers, each of which at least covers the respective top surface of the corresponding main body, and has a first surface attached to the top surface and a second surface printed with a character (or symbol), wherein the plural cover layers are independent from one another.

10 Claims, 10 Drawing Sheets

CAP-COVERED KEYBOARD APPARTUS

CROSS-REFERENCES TO RELATED APPLICATIONS

This application claims the benefits of Taiwan Patent Application Number 106210075 filed on Jul. 7, 2017, at the Taiwan Intellectual Property Office, the disclosures of which are incorporated herein in their entirety by reference.

FIELD OF THE INVENTION

The present invention relates to a cap-covered keyboard apparatus, in particular to a cap-covered keyboard apparatus including plural independent keycaps and plural independent cover layers.

BACKGROUND OF THE INVENTION

The keyboard apparatuses in the prior art, for example, a computer keyboard (used for computer apparatuses such as a desktop computer, a notebook computer etc) or a push-button telephone keyboard, the characters or symbols (including, for example: English alphabets, Mandarin phonetic symbols, operational symbols, etc) on the top surface of their keycaps are etched by the technique of plastic shell radium carving. Nowadays, the layouts of the commonly used computer keyboards can be divided into five categories: the US specification (103 keycaps, those used in the US, Taiwan, and Mainland China belong to this category), the European specification (104 keycaps, those used in Europe (including the United Kingdom) belong to this category), Brazilian Portuguese specification (106 keycaps, those used in Brazil belong to this category), Japanese specification (109 keycaps, those used in Japan belong to this category) and Korean specification (105 keycaps, those used in Korea belong to this category). Among these keyboards, not only the number of keycaps are different, the shapes of certain keycaps (for example, the enter key) and the arrangement and the layout of the keycaps are also different from one another. Not even to mention, among those keyboards belonging to the US specification or the European specification, the characters (or symbols) etched on the keycaps of those keyboards respectively used in the US, Taiwan and Mainland China, or those countries in Europe are not exactly the same, which increases the complexity of this matter even more. Furthermore, the costs of keycaps manufactured by the technique of plastic shell radium carving are relatively high, so manufacturing many different kinds of keycaps can be relatively costly.

On the market, there is a keyboard apparatus using an outer cover to cover the plural main bodies of keycaps. However, the outer cover is attached to all the keycaps of the keyboard such that when a user pushes down a specific keycap, this keycap will be pulled and drawn by a portion of the outer cover covering those keycaps adjacent to this keycap, which causes the texture of the keycap to degrade when the user touches each of the keycaps while using the keyboard. Thus, how to improve the configuration of the keycap to relatively decrease its costs, to improve the texture and appearance of the keycap are important aspects for development in the field.

Keeping the drawbacks of the prior art in mind, and through the use of robust and persistent experiments and research, the applicant has finally conceived of a cap-covered keyboard apparatus.

SUMMARY OF THE INVENTION

It is an objective of the present invention to provide a cap-covered keyboard apparatus such that each of the plural keycaps configured on the keyboard has relatively better texture and appearance than that of the keyboard apparatus in the prior art, and the cost of the keyboard apparatus of the present invention is relatively lower.

In accordance with the first aspect of the present invention, a cap-covered keyboard apparatus comprises plural independent keycaps, each of which includes a main body having a top surface, a cover layer covering the main body and including a shell fabric layer and a base material layer, and a hot melt adhesive layer configured between the main body and the cover layer, wherein the main body and the cover layer are attached to each other via the hot melt adhesive layer, the base material layer is attached to the main body, the shell fabric layer has a first surface with a character printed thereon, and a second surface attached to the base material layer, the character is located upon the top surface when the cover layer is attached to the main body, and the cover layers of the keycaps are independent of one another.

In accordance with the second aspect of the present invention, a cap-covered keyboard apparatus comprises plural independent keycaps, each of which includes a main body having a top surface, and a cover layer covering the main body and including a shell fabric layer and a base material layer, wherein the base material layer is attached to the main body, the shell fabric layer has a first surface with a symbol printed thereon, and a second surface attached to the base material layer, the symbol is located upon the top surface when the cover layer is attached to the main body, and the cover layers of the keycaps are independent of one another.

In accordance with the third aspect of the present invention, a cap-covered keyboard apparatus comprises plural independent keycaps, each of which includes a main body, and a cover layer covering the main body and including a shell fabric layer and a base material layer, wherein the base material layer is attached to the main body, the shell fabric layer has a first surface with a symbol printed thereon, and a second surface attached to the base material layer, the symbol is located on a top of the respective keycap when the cover layer is attached to the main body, and the cover layers of the keycaps are independent of one another.

BRIEF DESCRIPTION OF THE DRAWINGS

Other objectives, advantages and the efficacy of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of the preferred embodiments of this invention are presented herein for purposes of illustration and description only; they are not intended to be exhaustive or to be limited to the precise form disclosed.

Figure 1A:
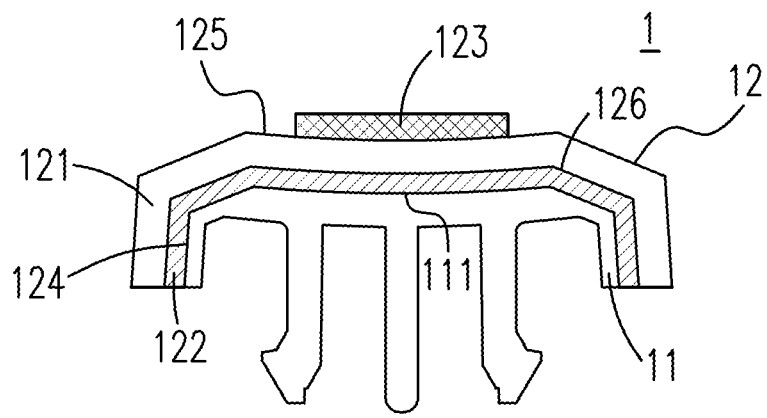
FIG. 1(a) is a sectional view diagram of a keycap when a Thermoplastic Polyurethane (TPU) material includes a hot melt adhesive material according to the first preferred embodiment of the present invention.

FIG. 1(a) shows a sectional view diagram of a keycap when a TPU material includes a hot melt adhesive material according to the first preferred embodiment of the present invention. The cap-covered keyboard apparatus proposed in the present invention includes plural independent keycaps and plural independent cover layers. In FIG. 1(a), the keycap 1 includes a main body 11 and a cover layer 12, wherein the main body 11 has a top surface 111, and the cover layer 12 includes a shell fabric layer 121 and a bottom layer (or a base material layer) 122. The cover layer 12 at least covers the respective top surface 111 of the corresponding main body 11, wherein each the cover layer 12 has a first surface 124 attached to the top surface 111 and a second surface 125 printed with a character (or a symbol) 123. The character (or the symbol) 123 is located upon the top surface 111 when the cover layer 12 is attached to the main body 11, and the plural cover layers 12 of the keyboard are independent of one another. The bottom layer 122 includes a thermoplastic polyurethane (TPU) material, or a material having a TPU material, the TPU material either includes a hot melt adhesive material, or does not include the hot melt adhesive material. Each the cover layer 12 is formed by the shell fabric layer 121 and the bottom layer 122 attached to each other. As shown in FIG. 1(a) when the TPU material includes the hot melt adhesive material, the bottom layer 122 includes a hot melt adhesive layer, and because the hot melt adhesive material is included in the bottom layer 122, the shell fabric layer 121 (it has a first surface 125 and a second surface 126) and the bottom layer 122 are attached to each other thereby.

Figure 1B:
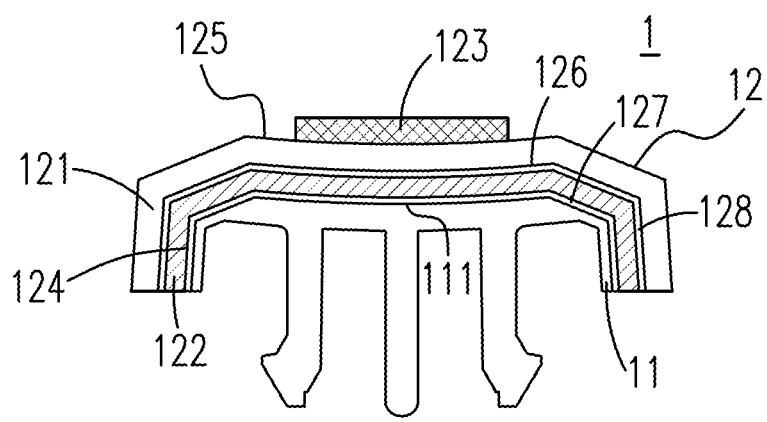
FIG. 1(b) is a sectional view diagram of a keycap when the TPU material does not include the hot melt adhesive material according to the first preferred embodiment of the present invention.

FIG. 1(b) shows a sectional view diagram of a keycap when the TPU material does not include the hot melt adhesive material according to the first preferred embodiment of the present invention. As shown n FIG. 1(b), when the TPU material does not include the hot melt adhesive material, except for a hot melt adhesive layer 127 between the first surface 124 of the cover layer 12 and the main body 11, there is a first layer of hot melt adhesive 128 between the shell fabric layer 121 and the bottom layer 122 such that the shell fabric layer 121, the bottom layer 122 and the main body 11 are attached to one another thereby.

Figure 2A:
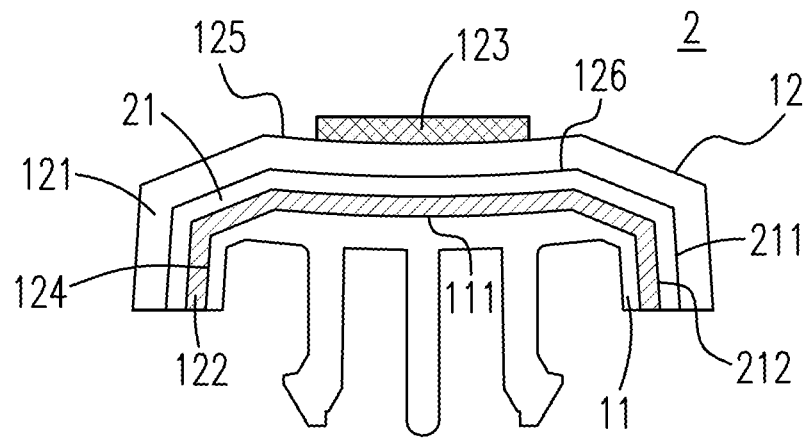
FIG. 2(a) is a sectional view diagram of a keycap when a TPU material includes a hot melt adhesive material according to the second preferred embodiment of the present invention.

FIG. 2(a) shows a sectional view diagram of a keycap when a TPU material includes a hot melt adhesive material according to the second preferred embodiment of the present invention. The differences between FIG. 2(a) and FIG. 1(a) are that the cover layer 12 of the keycap 2 includes a shell fabric layer 121 and a base material layer, and the base material layer includes a middle layer 21 and a bottom layer 122. The shell fabric layer 121 is selected from a group consisting of a leather, a fabric and a leatheroid, the leather has a softness, the fabric is one of a cloth with a base material of knitted fabric, and a cloth processed material, and the leatheroid is one selected from a group consisting of a Polyurethane (PU) leather, a Polyvinyl Chloride (PVC) leather, a dry process PU leather of a PU shell fabric combined with a knitted fabric, a wet process PU leather of a PU shell fabric combined with a knitted fabric base, and a leatheroid of a PVC shell fabric combined with a knitted fabric. Each the cover layer 12 is formed by sequentially attaching the shell fabric layer 121, the middle layer 21 and the bottom layer 122. Both the middle layer 21 and the bottom layer 122 include a TPU material, the TPU material is either with a hot melt adhesive material, or free from a hot melt adhesive material, and the middle layer 21 includes a third surface 211 and a fourth surface 212. When the TPU material includes the hot melt adhesive material, the bottom layer 122 includes the hot melt adhesive layer, and because the hot melt adhesive material included in the middle layer 21 and the bottom layer 122, the shell fabric layer 121, the middle layer 21, the bottom layer 122 and the main body 11 are attached to one another thereby.

Figure 2B:
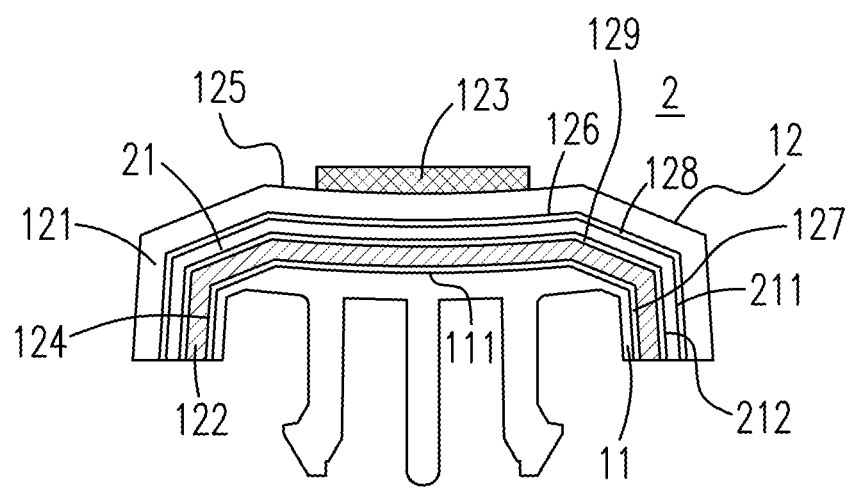
FIG. 2(b) is a sectional view diagram of a keycap when the TPU material does not include the hot melt adhesive material according to the second preferred embodiment of the present invention.

FIG. 2(b) shows a sectional view diagram of a keycap when the TPU material does not include the hot melt adhesive material according to the second preferred embodiment of the present invention. In FIG. 2(b), when the TPU material does not include the hot melt adhesive material, except for a hot melt adhesive layer 127 configured between the bottom layer 122 and the main body 11, there is a first layer of hot melt adhesive 128 between the third surface 211 and the shell fabric layer 121, and a second layer of hot melt adhesive 129 between the fourth surface 212 and the bottom layer 122 such that the shell fabric layer 121, the middle layer 21 and the bottom layer 122 are attached to one another thereby.

Figure 3A:
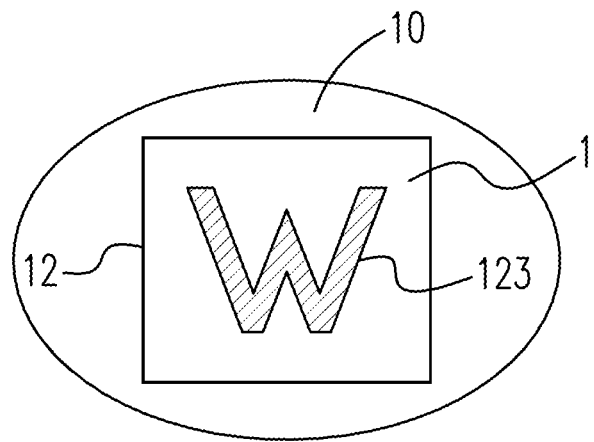
FIG. 3(a) is a top view diagram of a keycap of a keyboard according to the first preferred embodiment of the present invention.

FIG. 3(a) shows a top view diagram of a keycap of a keyboard according to the first preferred embodiment of the present invention. In FIG. 3(a), a specific keycap 1 of a keyboard 10 has a cover layer 12, and the cover layer 12 printed with a character (or a symbol) "W" on top of the keycap 1 and corresponding to the top surface 111 of the main body 11 (both 111 and 11 are not shown). There is a layer of UV adhesive painted on the character (or symbol) "W".

Figure 3B:
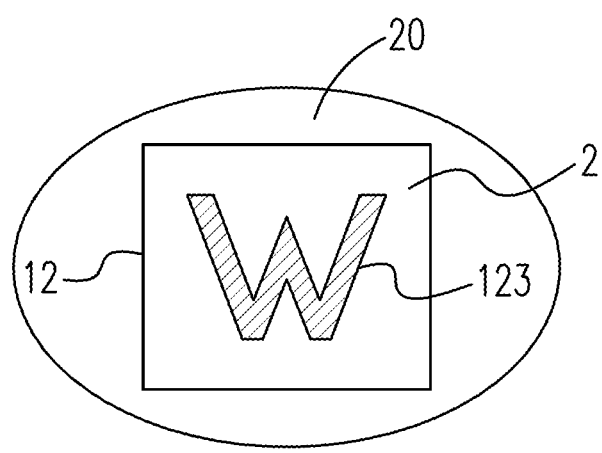
FIG. 3(b) is a top view diagram of a keycap of a keyboard according to the second preferred embodiment of the present invention.

FIG. 3(b) shows a top view diagram of a keycap of a keyboard according to the second preferred embodiment of the present invention. In FIG. 3(b), a specific keycap 2 of a keyboard 20 has a cover layer 12, and the cover layer 12 printed with a character (or a symbol) "W" on top of the keycap 2 and corresponding to the top surface 111 of the main body 11 (both 111 and 11 are not shown). There is also a layer of UV adhesive painted on the character (or symbol) "W".

Figure 4A:
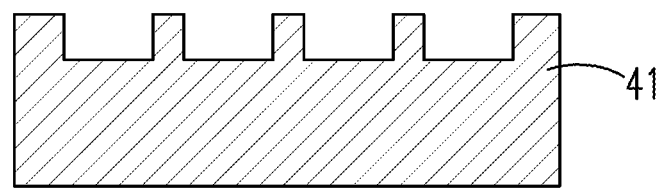
FIGS. 4(a) to 4(e) are respectively a schematic diagram of each of the steps of a method of manufacturing plural subdivisions being shaped and connected of cover layer of keycaps used for a keyboard according to the third preferred embodiment of the present invention.
Figure 4B:
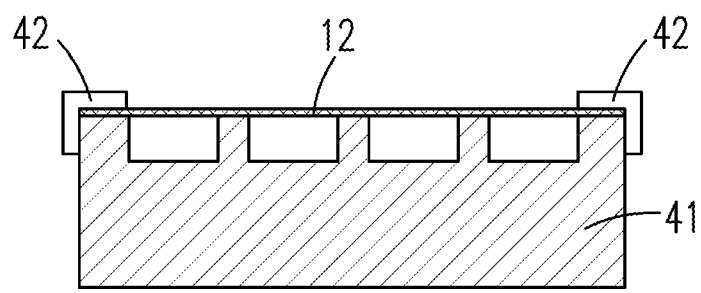
Figure 4C:
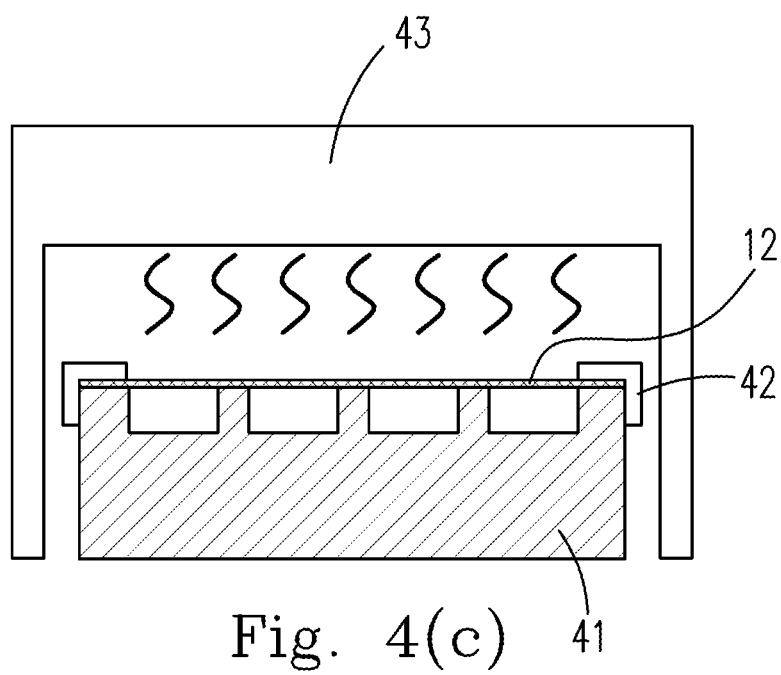
Figure 4D:
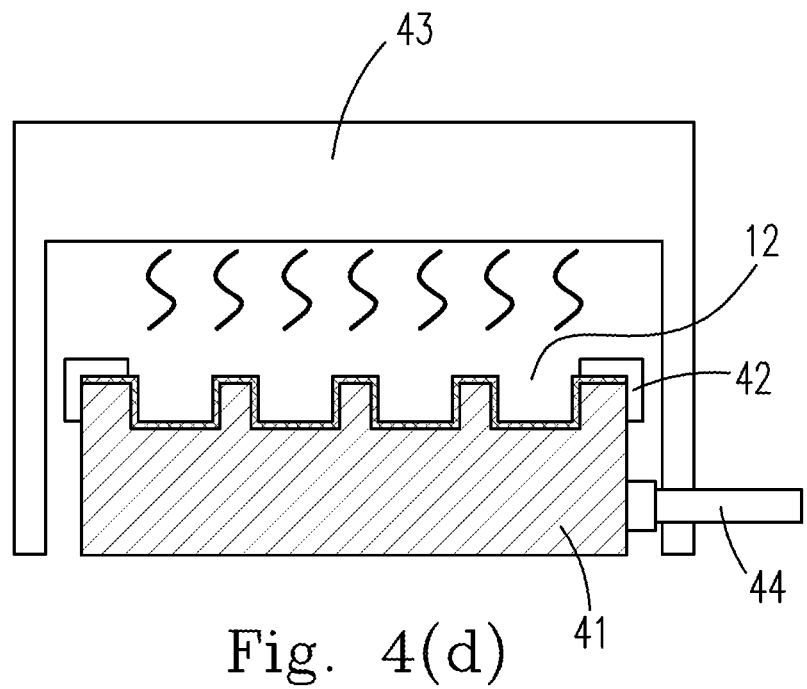
Figure 4E:
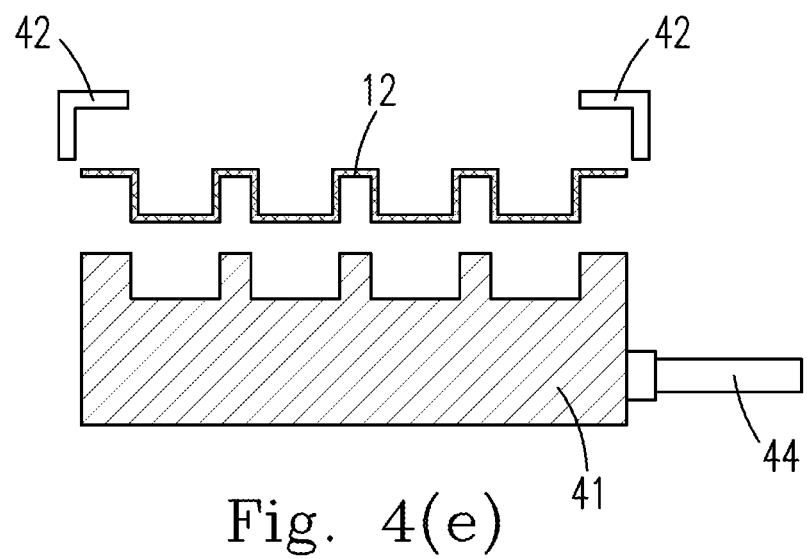

FIGS. 4(a) to 4(e) show respectively a schematic diagram of each of the steps of a method of manufacturing plural subdivisions being shaped and connected of a cover layer of keycaps used for a keyboard according to the third preferred embodiment of the present invention. This method is a vacuum forming method. In FIG. 4(a), it shows a step of installing a fixture, and a second fixture 41 is installed. In FIG. 4(b), it shows a step of fixing a material, and a cover layer 12 of a composite material is fixed on the second fixture 41 by two mount plates 42. In FIG. 4(c), it shows a step of baking a material, a heating device (it is a heater) 43 is pushed in and covers the cover layer 12 and all the devices originally shown in FIG. 4(b), and the cover layer 12 is heated completely. In FIG. 4(d), it shows a step of vacuum absorption, an exhaust pipe 44 is installed at the right-hand side of the second fixture 41, and a vacuum absorption is engaged such that the cover layer 12 is absorbed downward so as to attach to the second fixture 41. In FIG. 4(e), it shows a step of cooling formation, the heating device 43 is pulled out, when the cover layer 12 cools down, the fabric layer 121 (not shown) is shrunk due to the vacuum absorption such that the fabric layer 121 and the base material layer 122 (not shown) are setting on the second fixture 41 because of the cooling down, the base material layer 122 is stretched and becomes relatively thinner due to the shrinking and the cooling down of the fabric layer 121, which further causes the base material layer 122 to generate a softness so as to form plural subdivisions of cover layer 12 being shaped and connected (each the subdivision of the cover layer 12 is formed while facing downward).

Figure 5A:
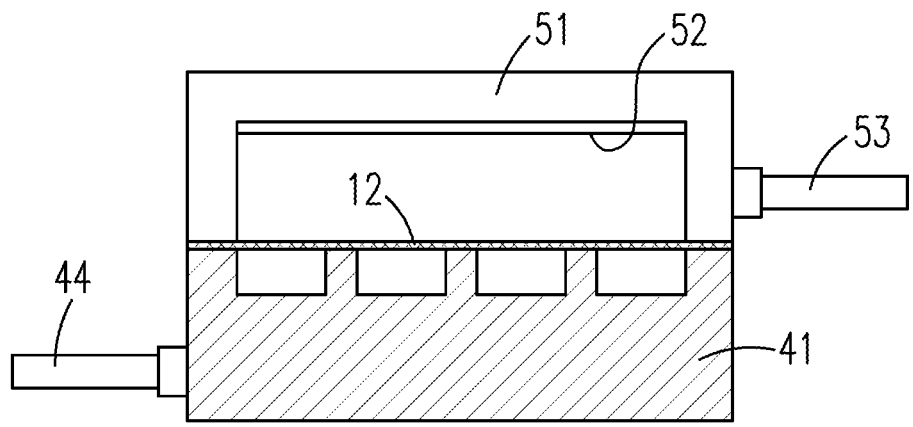
FIGS. 5(a) to 5(d) are respectively a schematic diagram of each of the steps of a method of manufacturing plural subdivisions being shaped and connected of cover layer of keycaps used for a keyboard according to the fourth preferred embodiment of the present invention.
Figure 5B:
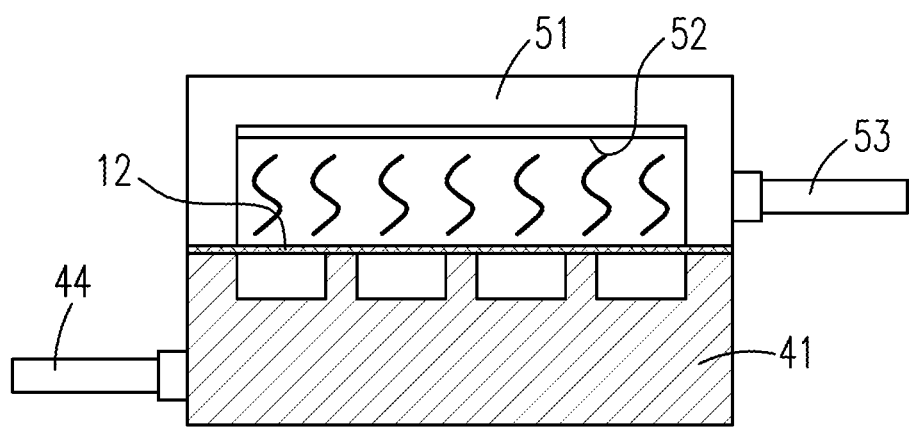
Figure 5C:
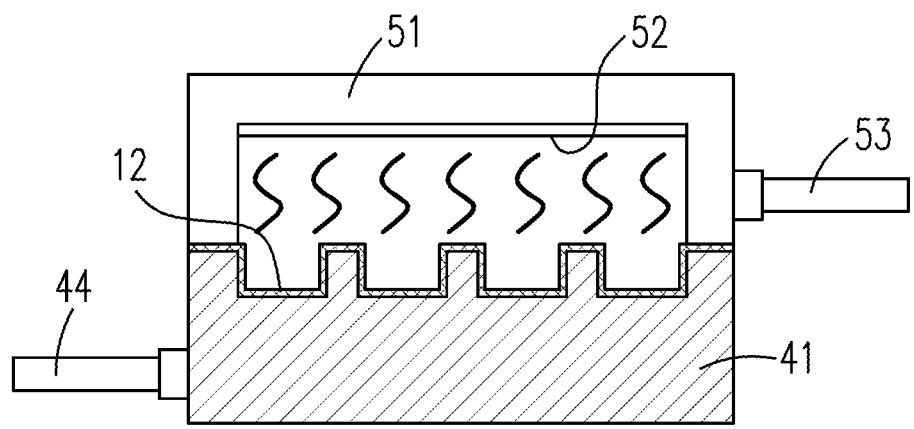
Figure 5D:
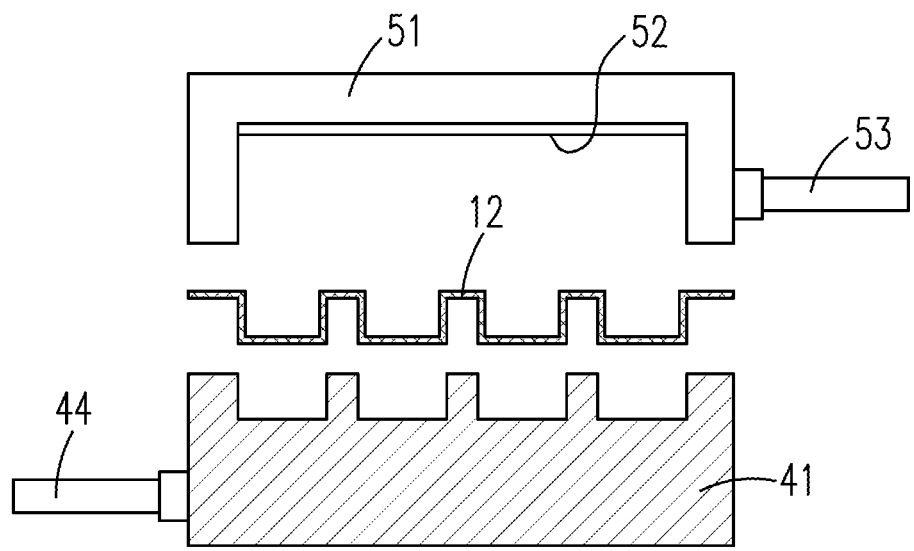

FIGS. 5(a) to 5(d) show respectively a schematic diagram of each of the steps of a method of manufacturing plural subdivisions being shaped and connected of a cover layer of keycaps used for a keyboard according to the fourth preferred embodiment of the present invention. This method is a high pressure gas molding method. In FIG. 5(a), it shows a step of installing a material, a cover layer 12 of a composite material is fixed on the second fixture 41, and an upper die 51 is placed to hold down the cover layer 12 of the composite material. The upper die 51 includes a heating device 52 and an air delivery pipe 53, and an exhaust pipe 44 is installed at the left-hand side of the second fixture 41. In FIG. 5(b), it shows a step of heating and baking a material, and the heating device (it is a heater) 52 is turned on such that the cover layer 12 of the composite material is heated completely. In FIG. 5(c), it shows a step of vacuum absorption, a pressurized air is inputted via the air delivery pipe 53, a vacuum absorption is engaged simultaneously, and the air is outputted via the exhaust pipe 44. In FIG. 5(d), it shows a step of cooling formation, the upper die 51 is pulled out, when the cover layer 12 cools down, the fabric layer 121 (not shown) is shrunk due to the vacuum absorption such that the fabric layer 121 and the base material layer 122 (not shown) are setting on the second fixture 41 because of the cooling down, the base material layer 122 is stretched and becomes relatively thinner due to the shrinking and the cooling down of the fabric layer 121, which further causes the base material layer 122 to generate a softness so as to form plural subdivisions of cover layer 12 being shaped and connected (each the subdivision of the cover layer 12 is formed while facing downward).

Figure 6A:
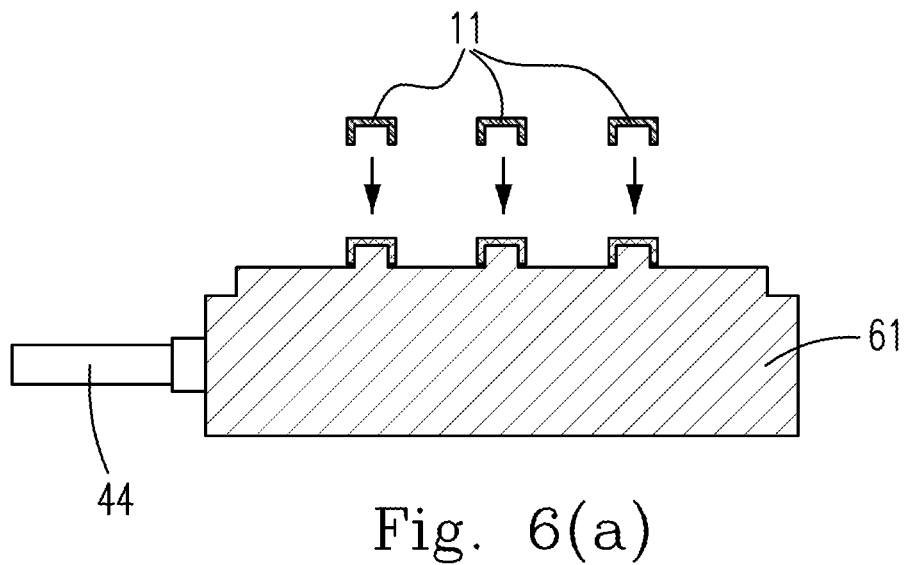
FIGS. 6(a) to 6(f) are respectively a schematic diagram of each of the steps of a method of manufacturing keycaps used for a keyboard according to the fifth preferred embodiment of the present invention.
Figure 6B:
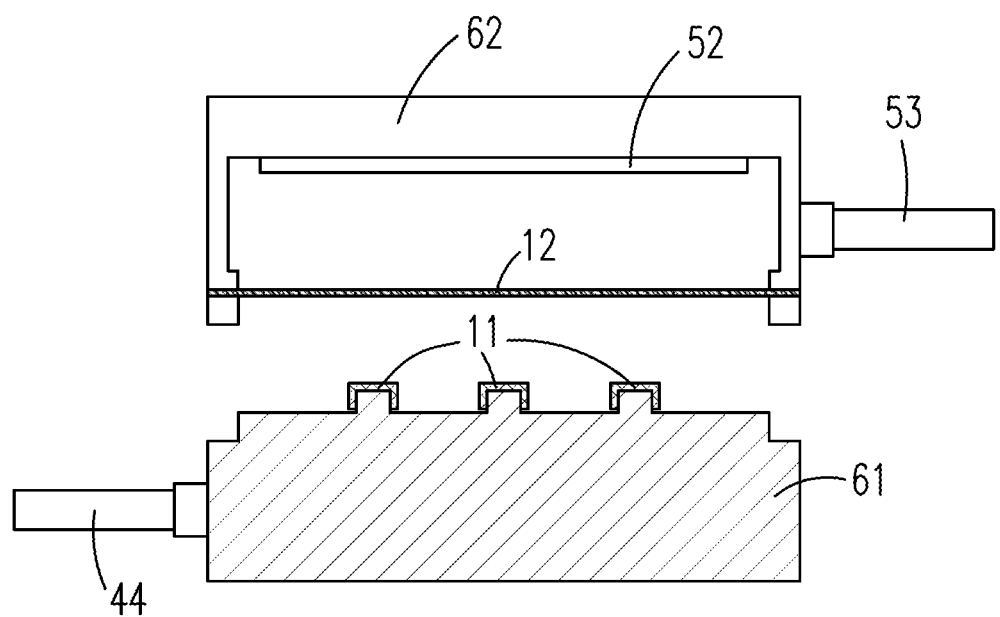
Figure 6C:
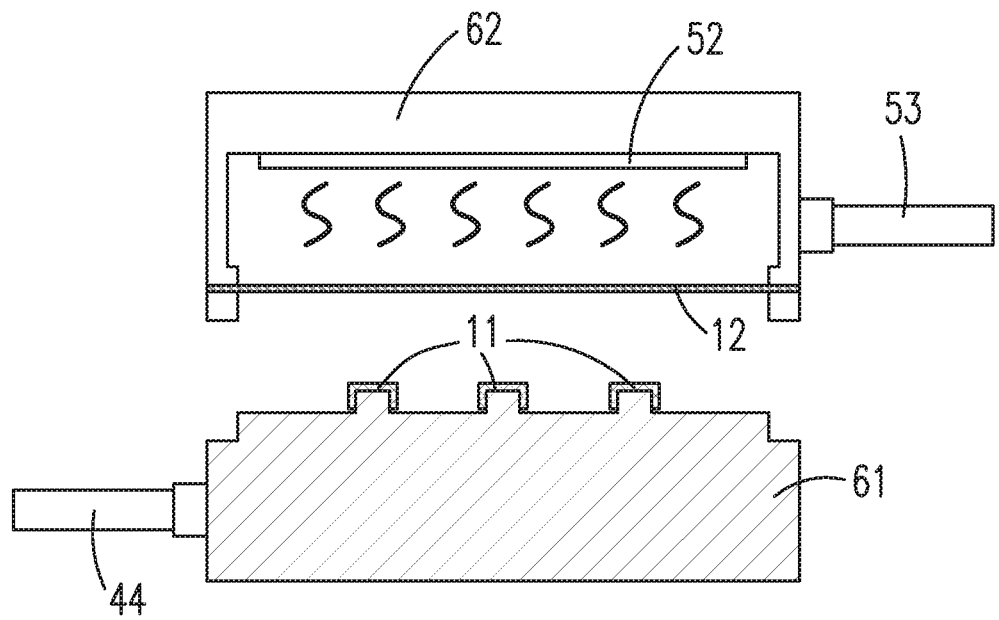
Figure 6D:
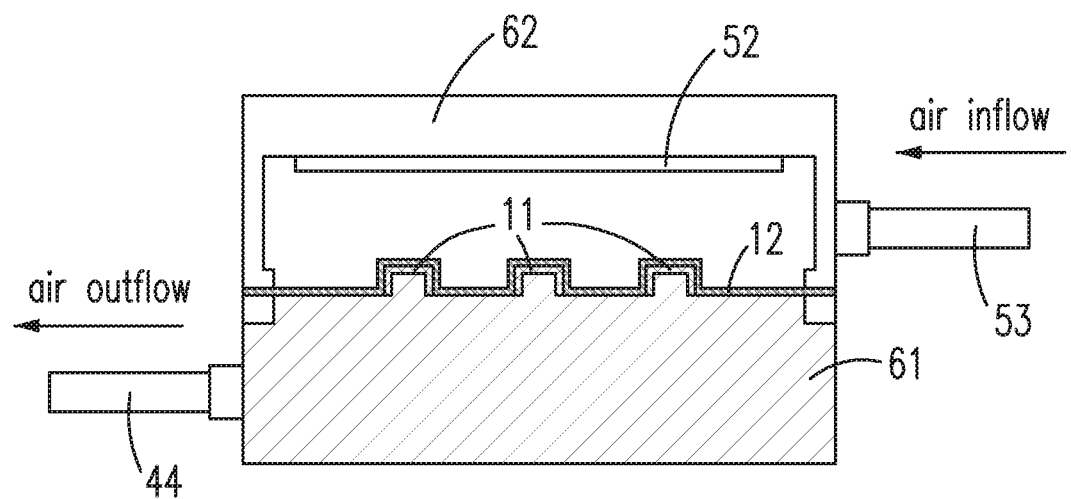
Figure 6E:
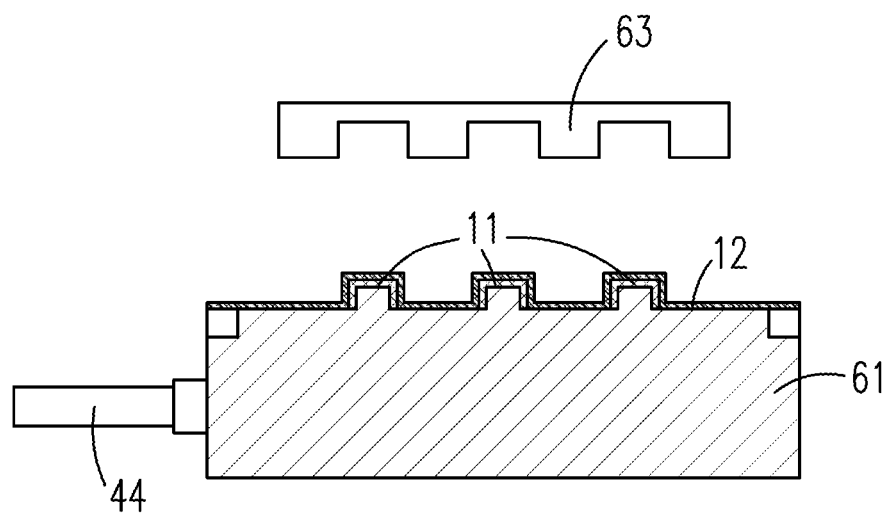
Figure 6F:
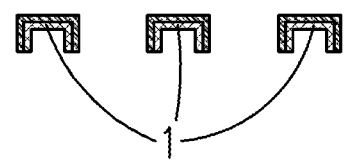

FIGS. 6(a) to 6(f) show respectively a schematic diagram of each of the steps of a method of manufacturing keycaps used for a keyboard according to the fifth preferred embodiment of the present invention. In FIG. 6(a), it shows a step of putting keycaps, a first fixture 61 is installed, an exhaust pipe 44 is installed at the left-hand side of the first fixture 61, and plural keycap main bodies 11 are put on the corresponding protrusions of the first fixture 61. In FIG. 6(b), it shows a step of fabric feeding, a cover layer 12 of a composite material is fixed in an upper die 62, the upper die 62 includes a heating device 52 and an air delivery pipe 53 configured on the right-hand side. In FIG. 6(c), it shows a step of heating and baking a material, and the heating device (it is a heater) 52 is turned on such that the cover layer 12 of the composite material is heated completely. In FIG. 6(d), it shows a step of vacuum absorption, a high pressure air or a non-high pressure air is inputted via the air delivery pipe 53, a vacuum absorption is engaged simultaneously, and the air is outputted via the exhaust pipe 44 such that the cover layer 12 is absorbed downward so as to attached on the first fixture 61 and the plural keycap main bodies 11 to form plural subdivisions of cover layer 12 being shaped and connected (each the subdivision of the cover layer 12 is formed while facing upward). The heating device 52 is pulled out, when the cover layer 12 cools down, the fabric layer 121 (not shown) is shrunk due to the vacuum absorption such that the fabric layer 121 and the base material layer 122 (not shown) are setting on the first fixture 61 because of the cooling down, and the base material layer 122 is stretched and becomes relatively thinner due to the shrinking and the cooling down of the fabric layer 121, which further causes the base material layer 122 to generate a softness so as to form the plural subdivisions of cover layer 12 being shaped and connected. In FIG. 6(e), it shows a step of cutting via knife mold, and a knife mold is used to cut the plural subdivisions of the cover layer 12 being shaped and connected and located on the first fixture 61 and the plural keycap main bodies 11. In FIG. 6(f), it shows a step of obtaining the final products, and plural independent keycaps 1 are obtained after the step in FIG. 6(e) is accomplished.

The plural subdivisions of cover layer 12 being shaped and connected, generated by the method shown in FIGS. 4(a) to 4(e) and by the method shown in FIGS. 5(a) to 5(d), can be used to produce the plural keycaps independent from one another if they are further manufactured by the amended method of FIGS. 6(a) to 6(f) (e.g., continued as the second half of the step in FIG. 6(c), the plural subdivisions of cover layer 12 being shaped and connected are put on top of the first fixture 61 and the plural keycap main bodies 11, and are heated by the heating device 52 in FIG. 6(d) to cause the plural subdivisions of the cover layer 12 being shaped and connected to be attached to the plural keycap main bodies 11, and then go through the step of cutting via knife mold in FIG. 6(e) so as to produce the plural keycaps independent from one another as shown in FIG. 6(f)).

Embodiments

1. A cap-covered keyboard apparatus, comprising plural independent keycaps, each of which includes:
a main body having a top surface;
a cover layer covering the main body and including a shell fabric layer and a base material layer; and
a hot melt adhesive layer configured between the main body and the cover layer, wherein the main body and the cover layer are attached to each other via the hot melt adhesive layer, the base material layer is attached to the main body, the shell fabric layer has a first surface with a character printed thereon, and a second surface attached to the base material layer, the character is located upon the top surface when the cover layer is attached to the main body, and the cover layers of the keycaps are independent of one another.

2. The cap-covered keyboard apparatus according to Embodiment 1, being one of a computer keyboard and a push-button telephone keyboard, wherein the shell fabric layer is one selected from a group consisting of a leather, a fabric and a leatheroid, the leather has a softness, the fabric is one of a cloth with a base material of knitted fabric and a cloth processed material, and the leatheroid is one selected from a group consisting of a Polyurethane (PU) leather, a Polyvinyl Chloride (PVC) leather, a dry process PU leather of a PU shell fabric combined with a knitted fabric, a wet process PU leather of a PU shell fabric combined with a knitted fabric base, and a leatheroid of a PVC shell fabric combined with a knitted fabric.

3. The cap-covered keyboard apparatus according to Embodiment 1 or 2, wherein the base material layer includes a middle layer and a bottom layer, both the middle layer and the bottom layer include a material having a thermoplastic polyurethane (TPU) material, and each the cover layer is formed by sequentially attaching the shell fabric layer, the middle layer and the bottom layer.

4. The cap-covered keyboard apparatus according to any one of the above-mentioned Embodiments, wherein the TPU material is in one of two states being with a hot melt adhesive material and being free from a hot melt adhesive material, and the middle layer includes a third surface and a fourth surface; when the TPU material includes the hot melt adhesive material, the shell fabric layer, the middle layer, the bottom layer and the main body are attached to one another thereby; and when the TPU material does not include the hot melt adhesive material, there are respectively a first and a second layers of hot melt adhesive between the third surface and the shell fabric layer, and between the fourth surface and the bottom layer such that the shell fabric layer, the middle layer and the bottom layer are attached to one another thereby.

5. The cap-covered keyboard apparatus according to any one of the above-mentioned Embodiments, wherein the base material layer is a bottom layer, the bottom layer includes a TPU material, the TPU material is in one of two states being with a hot melt adhesive material and being free from a hot melt adhesive material, and each the cover layer is formed by the shell fabric layer and the bottom layer attached thereto; when the TPU material includes the hot melt adhesive material, the shell fabric layer and the bottom layer are attached to each other thereby; and when the TPU material is free from the hot melt adhesive material, there is a layer of hot melt adhesive between the shell fabric layer and the bottom layer such that the shell fabric layer and the bottom layer are attached to each other thereby.

6. A cap-covered keyboard apparatus, comprising plural independent keycaps, each of which includes:
a main body having a top surface; and
a cover layer covering the main body and including a shell fabric layer and a base material layer, wherein the base material layer is attached to the main body, the shell fabric layer has a first surface with a symbol printed thereon, and a second surface attached to the base material layer, the symbol is located upon the top surface when the cover layer is attached to the main body, and the cover layers of the keycaps are independent of one another.

7. The cap-covered keyboard apparatus according to Embodiment 6, further comprising a hot melt adhesive layer configured between the main body and the cover layer for attaching the main body to the cover layer.

8. The cap-covered keyboard apparatus according to Embodiment 6 or 7, wherein the symbol is one selected from a group consisting of a character, an alphabet and a mark being one of a full and a part of one of a unit and a representation of a language.

9. A cap-covered keyboard apparatus, comprising plural independent keycaps, each of which includes:
a main body; and
a cover layer covering the main body and including a shell fabric layer and a base material layer, wherein the base material layer is attached to the main body, the shell fabric layer has a first surface with a symbol printed thereon, and a second surface attached to the base material layer, the symbol is located on a top of the respective keycap when the cover layer is attached to the main body, and the cover layers of the keycaps are independent of one another.

10. The cap-covered keyboard apparatus according to Embodiment 9, further comprising a hot melt adhesive layer configured between the main body and the cover layer for attaching the main body to the cover layer, wherein the main body includes a top surface, and the symbol is located upon the top surface when the cover layer is attached to the main body.

According to the descriptions above, the present invention discloses a cap-covered keyboard apparatus such that each of the plural keycaps configured on the keyboard has a relatively better texture and appearance than that of the keyboard apparatus in the prior art, and the cost of the keyboard apparatus of the present invention is relatively lower, and thus has non-obviousness and novelty.

While the invention has been described in terms of what is presently considered to be the most practical and preferred embodiments, it is to be understood that the invention need not be limited to the disclosed embodiments. Therefore, it is intended to cover various modifications and similar configurations included within the spirit and scope of the appended claims, which are to be accorded with the broadest interpretation so as to encompass all such modifications and similar structures.

What is claimed is:

1. A cap-covered keyboard apparatus, comprising:
a plurality of independent keycaps, each keycap including:
a main body having a top surface;
a cover layer covering the main body and including a shell fabric layer and a base material layer that are independent of all other keycaps; and
a hot melt adhesive layer configured between the main body and the cover layer, wherein the main body and the cover layer are attached to each other via the hot melt adhesive layer, the base material layer is attached to the main body, the shell fabric layer has a first surface with a character printed thereon, and a second surface attached to the base material layer, the character is located upon the top surface when the cover layer is attached to the main body, and the cover layers of the keycaps are independent of one another.

2. The cap-covered keyboard apparatus according to claim 1, being one of a computer keyboard and a push-button telephone keyboard, wherein the shell fabric layer is one selected from a group consisting of a leather, a fabric and a leatheroid, the leather has a softness, the fabric is one of a cloth with a base material of knitted fabric and a cloth processed material, and the leatheroid is one selected from a group consisting of a Polyurethane (PU) leather, a Polyvinyl Chloride (PVC) leather, a dry process PU leather of a PU shell fabric combined with a knitted fabric, a wet process PU leather of a PU shell fabric combined with a knitted fabric base, and a leatheroid of a PVC shell fabric combined with a knitted fabric.

3. The cap-covered keyboard apparatus according to claim 2, wherein the base material layer includes a middle layer and a bottom layer, both the middle layer and the bottom layer include a material having a thermoplastic polyurethane (TPU) material, and each the cover layer is formed by sequentially attaching the shell fabric layer, the middle layer and the bottom layer.

4. The cap-covered keyboard apparatus according to claim 3, wherein the TPU material is in one of two states being with a hot melt adhesive material and being free from a hot melt adhesive material, and the middle layer includes a third surface and a fourth surface; when the TPU material includes the hot melt adhesive material, the shell fabric layer, the middle layer, the bottom layer and the main body are attached to one another thereby; and when the TPU material does not include the hot melt adhesive material, there are respectively a first and a second layers of hot melt adhesive between the third surface and the shell fabric layer, and between the fourth surface and the bottom layer such that the shell fabric layer, the middle layer and the bottom layer are attached to one another thereby.

5. The cap-covered keyboard apparatus according to claim 2, wherein the base material layer is a bottom layer, the bottom layer includes a TPU material, the TPU material is in one of two states being with a hot melt adhesive material and being free from a hot melt adhesive material, and each the cover layer is formed by the shell fabric layer and the bottom layer attached thereto: when the TPU material includes the hot melt adhesive material, the shell fabric layer and the bottom layer are attached to each other thereby; and when the TPU material is free from the hot melt adhesive material, there is a layer of hot melt adhesive between the shell fabric layer and the bottom layer such that the shell fabric layer and the bottom layer are attached to each other thereby.

6. A cap-covered keyboard apparatus, comprising:
a plurality of independent keycaps, each keycap including:
a main body having a top surface; and
a cover layer covering the main body and including a shell fabric layer and a base material layer that are independent of all other keycaps, wherein the base material layer is attached to the main body, the shell fabric layer has a first surface with a symbol printed thereon, and a second surface attached to the base material layer, the symbol is located upon the top surface when the cover layer is attached to the main body, and the cover layers of the keycaps are independent of one another.

7. The cap-covered keyboard apparatus according to claim 6, further comprising a hot melt adhesive layer configured between the main body and the cover layer for attaching the main body to the cover layer.

8. The cap-covered keyboard apparatus according to claim 6, wherein the symbol is one selected from a group consisting of a character, an alphabet and a mark being one of a full and a part of one of a unit and a representation of a language.

9. A cap-covered keyboard apparatus, comprising:
a plurality of independent keycaps, each keycap including:
a main body; and
a cover layer covering the main body and including a shell fabric layer and a base material layer that are independent of all other keycaps, wherein the base material layer is attached to the main body, the shell fabric layer has a first surface with a symbol printed thereon, and a second surface attached to the base material layer, the symbol is located on a top of the respective keycap when the cover layer is attached to the main body, and the cover layers of the keycaps are independent of one another.

10. The cap-covered keyboard apparatus according to claim 9, further comprising a hot melt adhesive layer configured between the main body and the cover layer for attaching the main body to the cover layer, wherein the main body includes a top surface, and the symbol is located upon the top surface when the cover layer is attached to the main body.

* * * * *